United States Patent [19]

Pophal et al.

[11] Patent Number: 5,331,793
[45] Date of Patent: Jul. 26, 1994

[54] APPARATUS FOR FORMING A COFFEE FILTER

[76] Inventors: Paul E. Pophal, P.O. Box 1072, 312 S. 5th St.; Loren Greenman, 8141 Peters Rd., both of Eagle River, Wis. 54521

[21] Appl. No.: 8,217

[22] Filed: Jan. 25, 1993

[51] Int. Cl.$^5$ .............................................. B65B 47/04
[52] U.S. Cl. ...................................... 53/559; 53/453; 493/154; 493/174
[58] Field of Search ..................... 53/559, 563, 453; 493/79, 81, 154, 155, 167, 174

[56] References Cited

U.S. PATENT DOCUMENTS

| | | |
|---|---|---|
| 2,215,698 | 9/1940 | Harvey .............................. 493/154 |
| 2,690,634 | 10/1954 | Ketchpel . |
| 3,146,565 | 9/1964 | Otto . |
| 3,327,615 | 6/1967 | Swan . |
| 3,357,339 | 12/1967 | Schaab . |
| 3,381,604 | 5/1968 | Bixby, Jr. . |
| 3,552,976 | 1/1978 | King . |
| 4,007,674 | 2/1977 | Lichowsky . |
| 4,134,332 | 1/1979 | Merman . |
| 4,147,014 | 4/1979 | Tashiro ............................... 53/559 |
| 4,426,919 | 1/1984 | Rhoten . |
| 4,506,596 | 3/1985 | Shigenobu et al. . |

*Primary Examiner*—Jack Lavinder
*Attorney, Agent, or Firm*—Godfrey & Kahn

[57] ABSTRACT

An apparatus 10 for forming a coffee filter has a filter compartment 14 and a primary compartment 16. A filter roll 22 is unwound from the filter roll compartment 14 and fed into the primary compartment 16. Within the primary compartment 16 is a suspended floor 24 having an aperture 44, a pair of fingers 76 which indexes the filter paper across the aperture 44, and a plunger 116 having an outside dimension which is matingly received in the aperture 44 of the floor 24. The filter paper is conformably sized about the outside dimension of the plunger 116 when the filter paper is indexed to a position across the aperture 44 and the plunger 116 is moved through the aperture 44 in the floor 24. A clamp 119 is used to hold the filter paper against the floor 24. Upon travel of the plunger 116 through its stroke, a discrete coffee filter is formed and separated from the remainder of the filter roll 22 at the location where the clamp 119 is depressed against the filter roll 22. Upon separation of the discrete coffee filter from the remainder of the filter roll 22, the filter is ejected into a basket.

12 Claims, 7 Drawing Sheets

APPARATUS FOR FORMING A COFFEE FILTER

FIELD OF THE INVENTION

The present invention relates generally to an apparatus for forming discrete coffee filters from a roll of filter paper.

BACKGROUND OF THE INVENTION

Coffee filters are commercially available to consumers and restaurant establishments in a frusto-conical shape, such filters being in stacked configuration. When used by consumers or employees of the restaurants, a discrete coffee filter is typically removed from the stack and placed in a basket, whereupon coffee grounds are measured and placed in the filter, and the basket is transferred to a coffee brewer for brewing. In separating the coffee filter from the stack, an individual handling the filter may not necessarily have clean or sterile hands, which may potentially cause germs to be transferred to and be carried by the filters themselves. This arrangement also requires additional steps of measuring the coffee grounds and transferring the filter with grounds therein to the coffee brewer.

Accordingly, a need has arisen for an apparatus which does not require the user to handle the individual coffee filters, which permits the coffee grounds to be pre-measured and standing by for coffee brewing when desired, and which may facilitate transference of the coffee filter with grounds therein to a coffee filter.

SUMMARY OF THE INVENTION

In accordance with the present invention, an apparatus for forming a coffee filter has a filter roll compartment, a primary compartment, and a chute compartment. A roll of coffee filter paper is contained within the filter paper compartment, the filter paper being unwound and fed into the primary compartment. Within the primary compartment is a suspended floor having an aperture, a pair of fingers which indexes the filter paper across the aperture, and a plunger having an outside dimension which is matingly received by the aperture in the floor. The filter paper is conformably sized about the outside dimension of the plunger when the filter paper is indexed to a position across the aperture and the plunger is moved through the aperture in the floor.

A clamp is used to hold the filter paper against the floor. Upon travel of the plunger through its stroke, a discrete coffee filter is formed and separated from the remainder of the filter roll at the location where the clamp is depressed against the filter roll. Upon separation of the discrete coffee filter from the remainder of the filter paper, the filter is ejected into a basket. The above functions are carried out by a combination of elements which are actuated by a manual lever and which is manipulated by the user.

The plunger has a hollow interior and the apparatus includes a chute which extends from the chute compartment. Coffee grounds may be conveyed down the chute through the hollow interior of the plunger, and into the newly formed coffee filter.

The apparatus of the present invention permits a user to avoid having to touch or handle the filter paper, thus ensuring cleanliness and sterility of the coffee filter and its contents. The coffee grounds may be measured in advance and released down the chute at the desire of the user. The apparatus further eliminates a step of having to transfer the coffee filter to a basket through which the coffee is brewed, as the filter is automatically ejected into such basket.

Further objects, features, and advantages of the present invention will become apparent from the following detailed description, taken in conjunction with the accompanying drawings.

DETAILED DESCRIPTION OF THE PREFERRED EMBODIMENT

Figure 1:
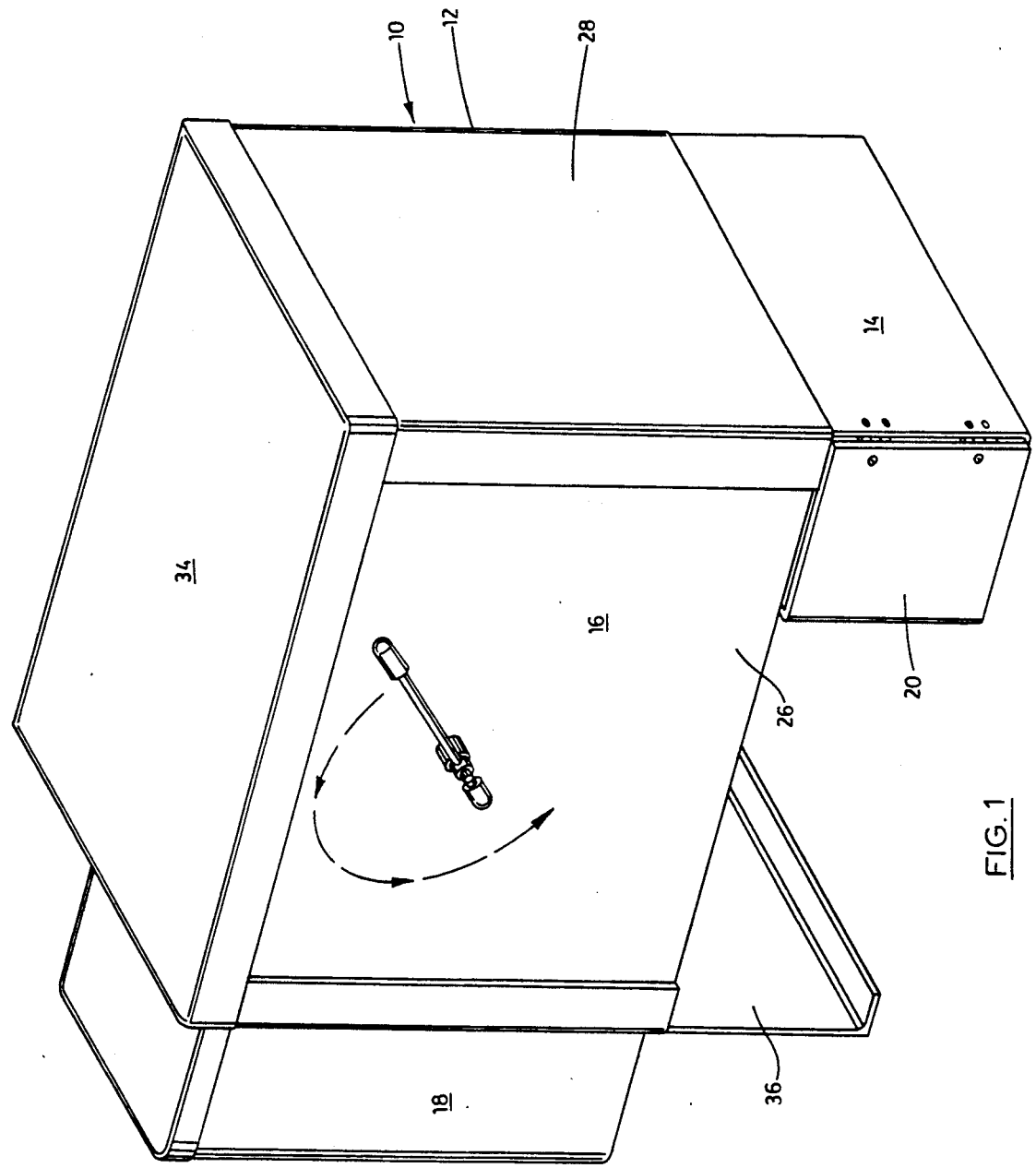
FIG. 1 is a perspective environmental view of the exterior of the apparatus for forming a coffee filter of the present invention.
Figure 2:
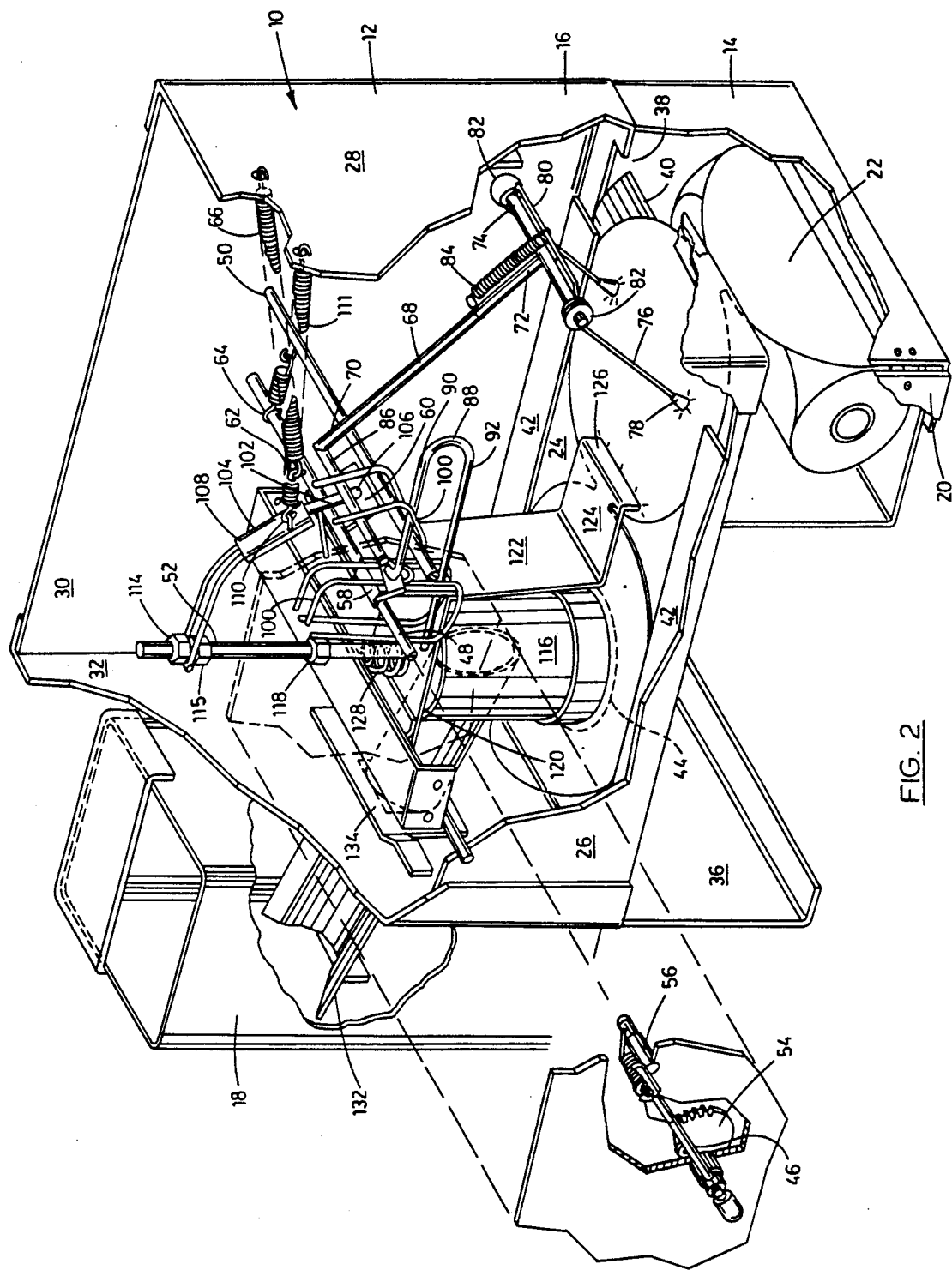
FIG. 2 is a perspective view of the apparatus for forming a coffee filter of the present invention, with the lid removed, and with wall and door portions cut away and exploded to show the interior of the apparatus.

With reference to the drawings, an apparatus for forming a coffee filter of the present invention is shown generally in the figures at numeral 10. As shown in FIG. 1, the apparatus 10 includes a housing 12, which includes a filter roll compartment 14; a primary compartment 16; and a chute compartment 18. The filter roll compartment 14 includes a door 20 which provides access to the interior of the filter roll compartment 14 for maintenance or replacement of a filter roll 22. The filter roll compartment 14 is shown with a filter roll 22 rotatably mounted therein and fed into the primary compartment 16 in a manner which is explained in greater detail below. The filter roll 22 is shown in the preferred form, that is, a roll of paper stamped or cut so as to form a series of substantially circular shaped paper portions which are joined in sequence and wound about a roll. To accommodate existing coffee brewing machines for which the filter is formed by the apparatus 10, the diameter of the circular paper portions may be either 8 inches or 10 inches.

The primary compartment 16 includes a floor 24; sidewalls 26; 28; 30 and 32; and a lid 34 which together generally forms a box like configuration. The interior of the sidewall 28 includes bumpers 35, which are explained in greater detail below. A bracket 37 extends between the sidewalls 26 and 30. The floor 24 of the primary compartment 16, is surmounted on a pedestal 36, and the filter roll compartment 14, thereby suspending the floor 24 above the supporting surface, upon which the apparatus 10 has been placed. This supporting surface may be a cabinet counter or the like, not shown. The floor 24 defines a slot 38 in the region where the primary compartment 16 is mounted upon the filter roll compartment 14. The slot 38 is oriented substantially parallel to the orientation of the filter roll 22 such that the filter paper roll may be unwound and fed through the slot 38 into the primary compartment 16. The leading edge 40 of the slot 38 is curved generally downwardly in the direction of the filter roll compartment 14 thereby facilitating the feeding of the filter paper which is unwound from the filter paper roll 22 into the primary compartment 16. Individual rails 42 are borne by the walls 26 and 30 and are spaced from the floor 24 to provide sufficient clearance such that the filter roll paper may pass therebetween. The rails 42 are additionally spaced at predetermined distance apart from each other. This distance is typically less than the diametral dimension of the individual filter portions of the filter paper roll 22. The paper of the filter paper roll 22 may thus be fed through the slot 38 and fed under the rails 42. The floor 24 additionally defines an aperture 44 which is discussed in greater detail below.

Within the interior of the primary compartment 16 are a combination of elements which are used to index the paper of the filter paper roll 22 there through; clamp the paper of the filter paper roll 22; and conformably shape a discrete coffee filter and separate such filter from the remainder of the filter paper roll 22. The apparatus 10 also includes a manual lever 46 which is mounted on the outside of the sidewall 26, the rotation of which by the user accomplishes the aforementioned tasks. While a manually driven lever is disclosed, it should be understood that various other means could be utilized in place of the manual lever to impart power to the present apparatus.

Figure 3:
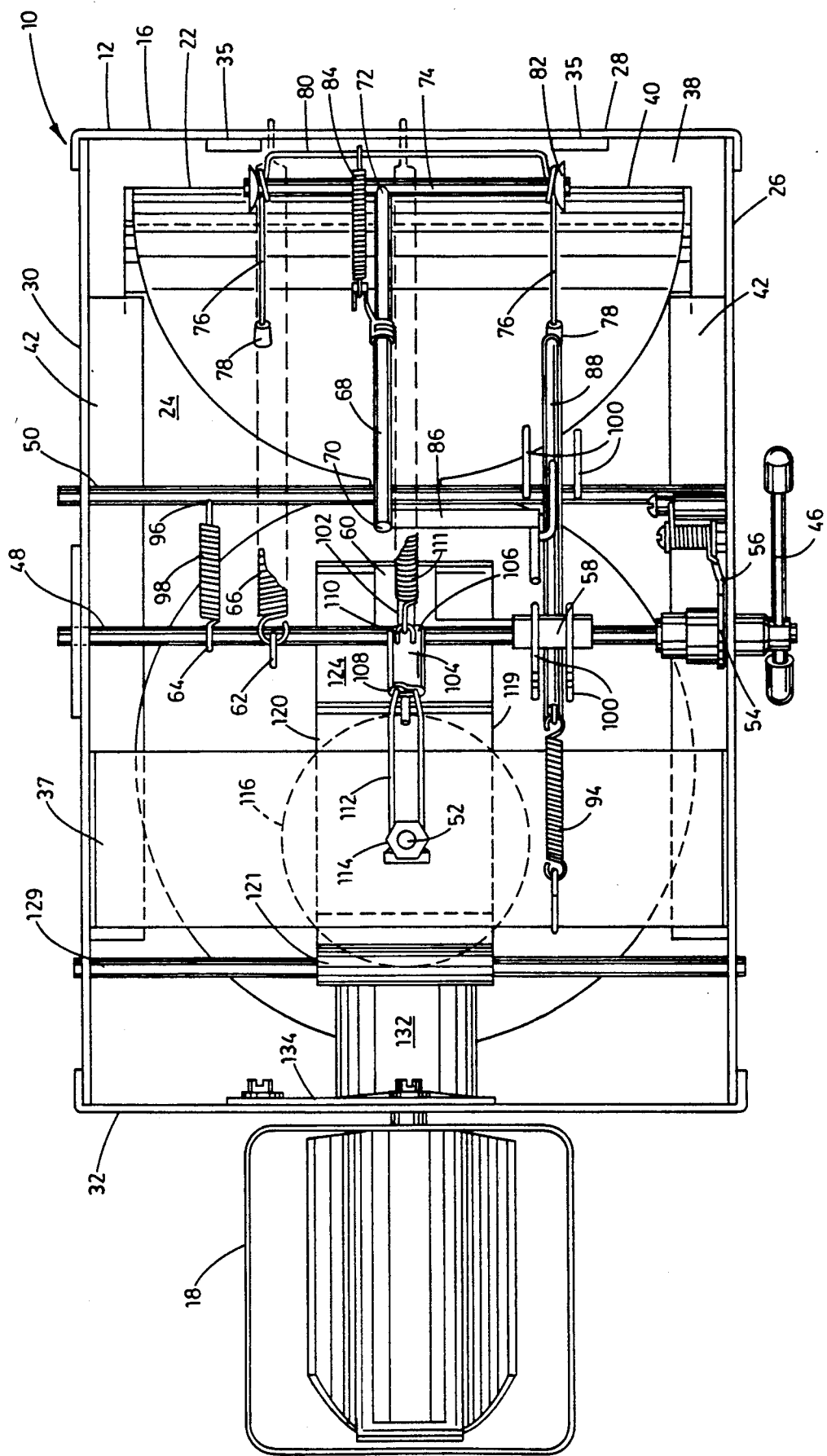
FIG. 3 is a top plan view of the apparatus for forming a coffee filter of the present invention with the lid removed.
Figure 4:
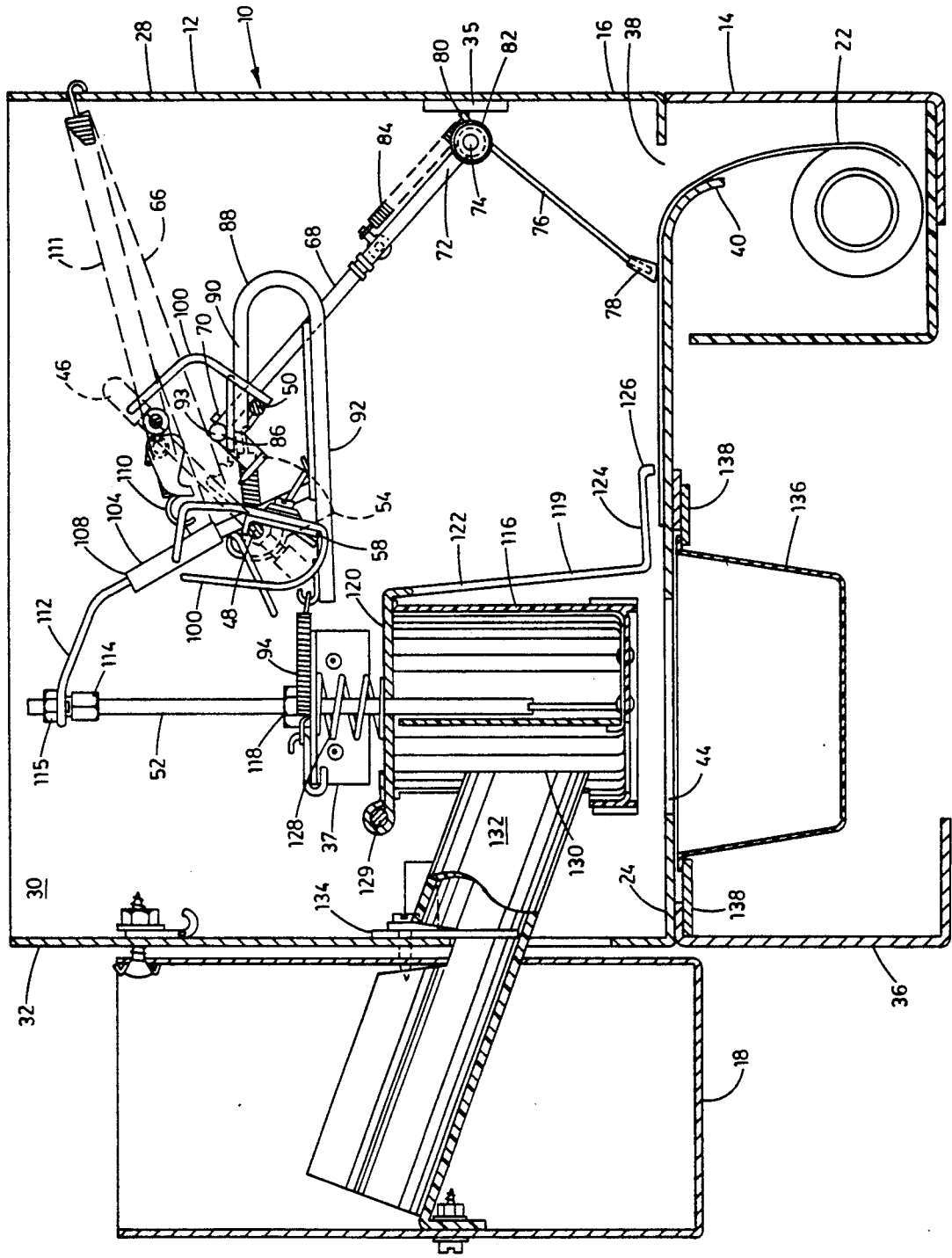
FIG. 4 is a sectional view of the apparatus taken along line 4—4 to show the interior of the apparatus from the side, the apparatus being depicted with the fingers retracted and the filter paper fed into the apparatus.

The manual lever 46 is directly connected to a drive shaft 48, and indirectly connected to an idler shaft 50, and piston rod 52, such that rotation of the lever 46 in a predetermined direction turns the drive shaft 48; rotation is further translated to the idler shaft 50; and reciprocating motion is imparted to the piston rod 52. On the interior of the sidewall 26 a ratchet 54 is mounted. The ratchet engages a pawl 56 which is mounted on the drive shaft 48. The pawl 56 engages in meshing relationship with the toothed ratchet 54 to permit a controlled counterclockwise rotation of the lever 46 from a start position, such as shown in FIGS. 1 and 4, through a cycle established by the teeth of the ratchet 54. At the end of the cycle, the manual lever 46 may then be returned to the start position. As best seen in FIG. 3, the drive shaft 48 further includes a detent bracket 58 which translates motion to the idler shaft 50; a bracket 60 which translates motion to the piston rod 52; and spring connection 62 and 64, respectively. A coil spring 66 is connected between the spring connection 62 and the sidewall 28 to bias the rotation of the drive shaft in a predetermined direction.

Attached to the idler shaft 50 is a boom 68 which has a proximal end 70, and a distal end 72. The boom is fixedly attached on the idler shaft 50 near the proximal end 70, by welding or other suitable fastening means. The boom 68 extends substantially radially outwardly relative to the axis of the idler shaft 50, the distal end 72 terminating in a cross piece 74 which is oriented substantially parallel to the idler shaft 50. Individual fingers 76 depend from each end of the cross piece 74, and extend downwardly towards the floor 24. Each of the fingers 76 terminate in a distal tip 78 which is formed of a material such as silicon. The silicon tip 78 is operable to frictionally engage the material of the filter paper roll 22. The individual fingers 76 are made integral with a single piece or a slender rod 80, which is wound about the ends of the cross piece 74 thereby permitting rotation about the cross piece 74. A washer 82 is frictionally fitted on each of the ends of the cross piece 74 thereby holding the rod 80 in place upon the cross piece 74. A coil spring 84 is connected to the boom 68 at a point intermediate the proximal and distal end 70 and 72, respectively into the rod 80. The coil spring 84 urges the finger 76 downwardly and against the floor 24.

The proximal end 70 of the boom 68 extends for a short distance beyond the idler shaft 50. A straight rod 86 is attached on the boom 68, the rod 86 extending substantially perpendicularly outwardly relative to the boom 68 and substantially parallel to the idler shaft 54. A u-shaped link 88 is oriented in a plane which is disposed in radially outwardly relation relative to the shafts 48 and 50, and further has a first leg 90, and second leg 92. The end of the first leg 90 is rotatably attached on the end of the rod 86 at a pivot point 93, and the end of the second leg 92 is attached to a first end of a coil spring 94 which is further attached to the bracket 37. The second leg 92 of the u-shaped link is translated from left to right (as depicted in the orientation of FIGS. 4 through 7). This causes rotation of the u-shaped link 88 about the pivot point 93, which in turn causes clockwise rotation of the idler shaft 50, and further directs the finger 76 to travel from right to left (as depicted in the orientation of FIGS. 4 through 7). As earlier discussed, the fingers 76 are urged against the floor 24 during the course of their travel.

The idler shaft 50 includes a spring connection 96 and a coil spring 98 is connected between the spring connection 64 which is located on the drive shaft 48, and the spring connector 96 which is located on the idler shaft 50, such that the shafts 45 and 50 are biased against each other upon rotation. The shafts 48 and 50 both have projections 100 which are operable to maintain the orientation of the u-shaped link 88 in the plane which is substantially radial to the shafts 48 and 50.

The bracket 60 which is fastened on the drive shaft 48, translates motion to the piston rod 52. The bracket 60 further includes a slot 102. The apparatus 10 additionally has an arm 104 which has a first end 106 and a second end 108, the arm 104 being positioned against the drive shaft 48 at a pivot point 109 which is located between the first and second ends 106 and 108. The arm translates motion to the piston rod 52 by acting as a lever. The first end 106, of the arm 104, is inserted into the slot 102 of the bracket, and the second end 108 of the arm 104 has a spring connection 110. A coil spring 111 is connected between the spring connection 110 and the side wall 28 to bias the arm 104 in the direction of the sidewall 28. A slide 112 is attached on the second end 108 of the arm 104 and is matingly received, or otherwise secured between nuts 114 and 115, respectively. The nuts 114 and 115 act as spacers and retain the slide 112 therebetween. As should be understood, and upon counterclockwise rotation of the drive shaft 48, the slide 112 will direct downward pressure upon the nut 114 with the result that the piston rod 52 will be directed or otherwise urged downwardly through a given stroke. The piston rod 52 terminates in a cylindrically shaped piston or plunger 116 which defines a hollow interior chamber and which further is open ended. The outside diameter of the plunger 116 is sized to mate with the aperture 44 which is defined by the floor 24, such that there is sufficient clearance to enable the plunger 116 to extend therethrough when the piston rod is directed downwardly through its given stroke. The piston rod 52 extends through a hole in the bracket 37. A bushing 118 is mounted in substantially coaxial relationship relative to the hole in the bracket and the longitudinal axis of the piston rod 52, the bushing 118 facilitating the reciprocal motion of the piston rod 52 along its longitudinal axis.

Located in a predetermined position along the length of the piston rod 52 is a clamp 119 which has a first segment 120; a second segment 122; a third segment 124; and a fourth segment 126. The first segment 120 is substantially flat and includes a lip 121 and further defines a hole through which the piston rod 52 extends. The second, third, and fourth segments 122, 124, and 126, respectively, are formed by bends in the clamp 119 and are otherwise disposed in various angular orientations one to the other. The piston rod 52 extends through a coil spring 128, the coil spring 128 being positioned between the bracket 37 and first segment 120 of the clamp 119. The coil spring 128 biases the first segment 120 of the clamp 119 directly against the top of the plunger 116. The lip 121, extends around a shaft 129 that extends between the sidewalls 26 and 30 such that the clamp 119 will pivot about the shaft 129. The clamp 119 is shaped such that the fourth segment 126 is directed against the floor 24 in a clamping action at a predetermined location and at a preselected time during the given stroke of the piston rod 52.

The plunger 116 defines a radially oriented hole 130. A chute 132 extends between the chute compartment 18, and the radial hole 130, and the plunger 116 such that coffee grounds may be conveyed between the chute compartment 18 and the hollow interior chamber of the plunger 116. The chute compartment 18 further includes a removable lid, as shown in FIG. 1, which may be removed to access the chute 132. A gate 134 is positioned on the inside of the sidewall 32 and may be manually opened and closed to permit coffee grounds to be conveyed down the chute and into the hollow interior chamber of the plunger.

The apparatus 10 further includes a basket 136 which is positioned directly under the aperture 44. Rails 138 are located on the underside of the floor 24 such that the basket 136 may be slid out from the apparatus 10 on the rails 138 and separated from the remainder of the apparatus 10. As should be apparent, the basket may be slid back into a position under the aperture 44 upon the rails 138.

OPERATION

The operation of the described embodiment of the present invention is believed to be readily apparent and is briefly summarized at this point.

In the operation of the apparatus 10, a filter roll 22 is threaded into the apparatus 10 in a manner such as is shown in FIG. 4. As best seen in FIG. 4, the filter roll 22 is sandwiched or otherwise disposed therebetween the floor 24 and the tip 78 of the fingers 76. Further, the boom 68 is positioned near to or against the bumpers 35; the clamp 119 is positioned away from the floor 24; and the plunger 116 is in a retracted position. FIG. 3 additionally shows the position of the manual lever 46 when the apparatus 10 is in the "start position."

Figure 5:
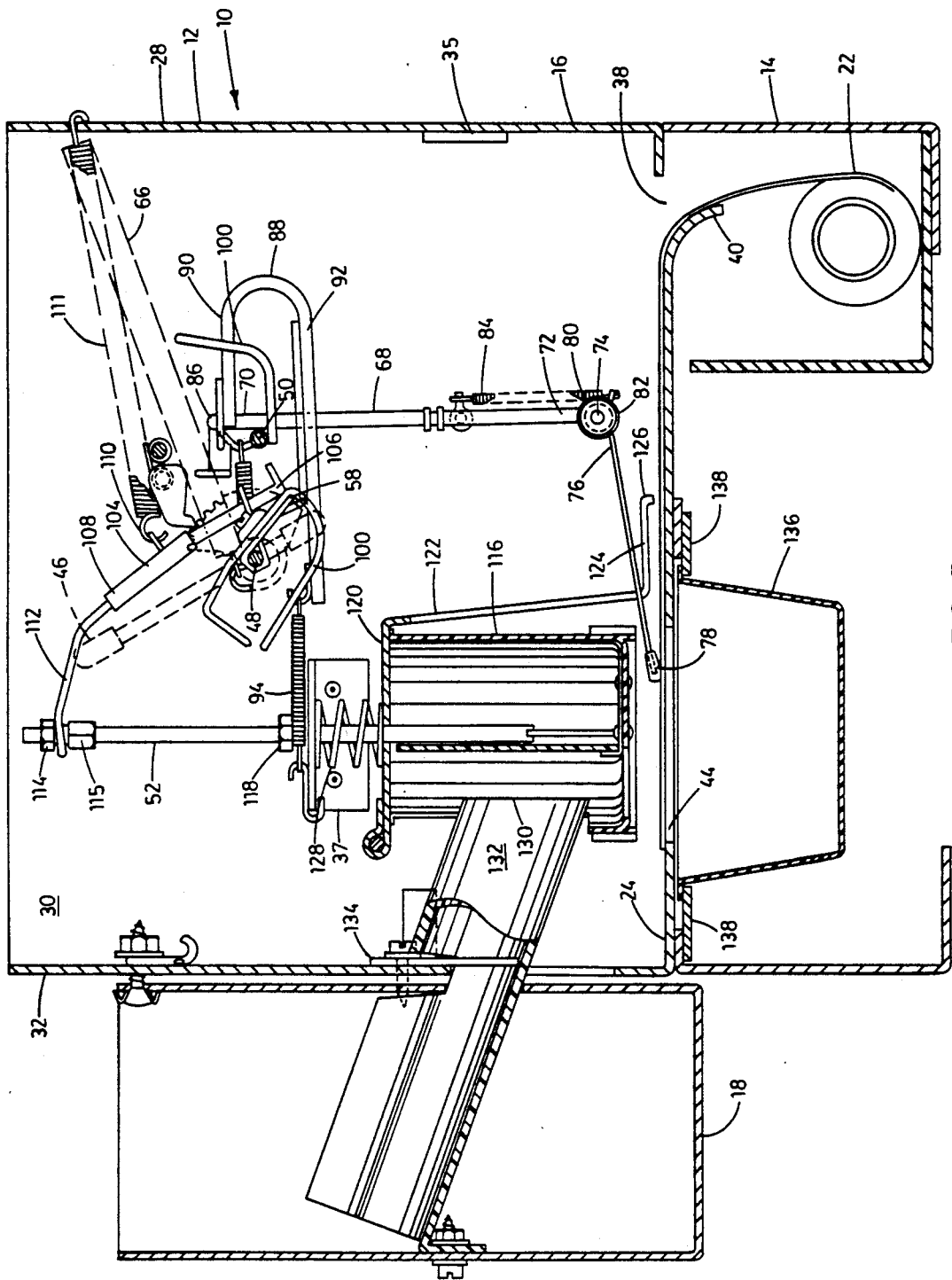
FIG. 5 is a sectional view of the apparatus as shown in FIG. 4, the apparatus being depicted in a sequence of operation subsequent to that of FIG. 4 with the fingers being extended to advance the filter paper under the plunger.
Figure 6:
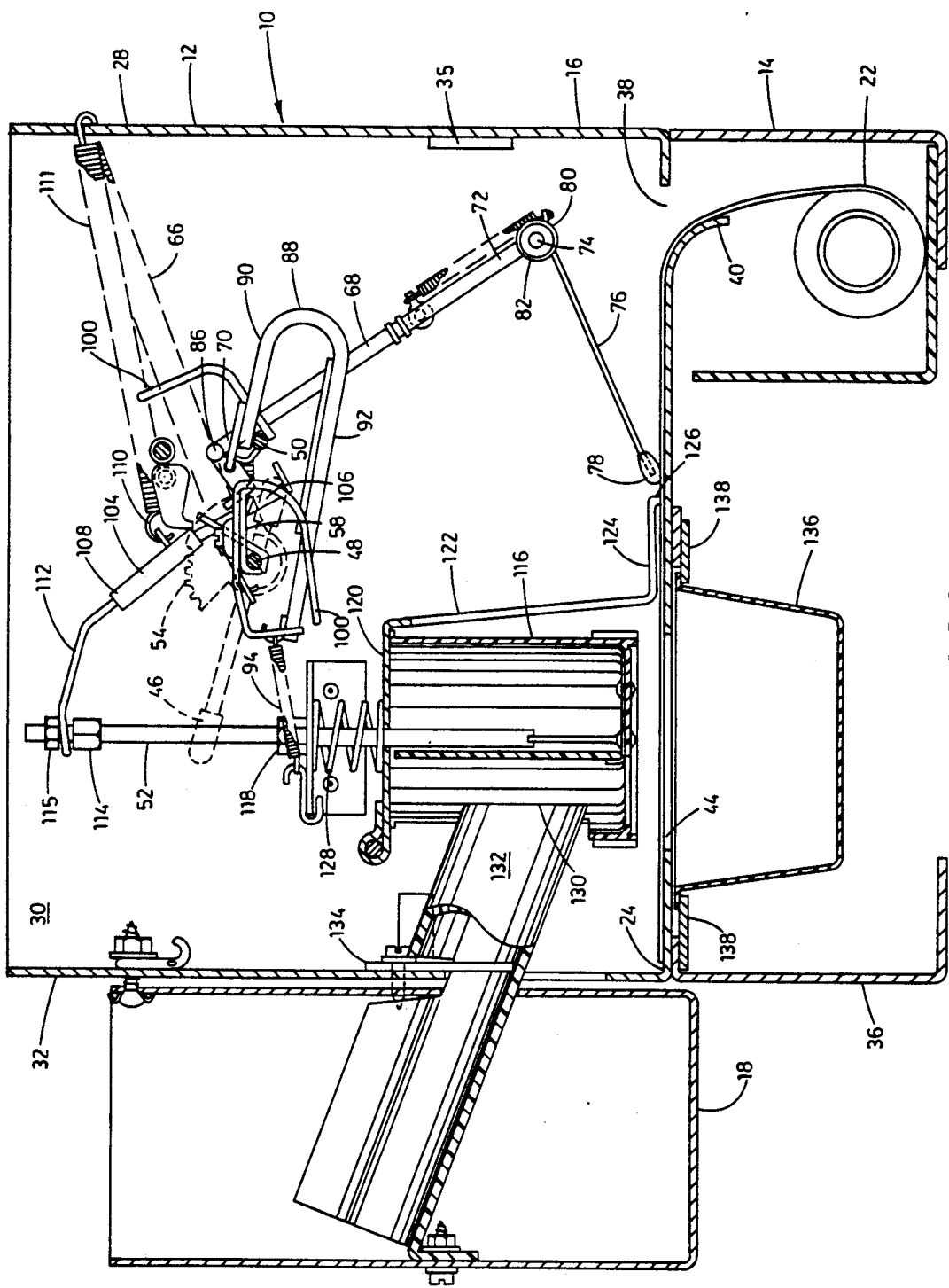
FIG. 6 is a sectional view of the apparatus as shown in FIG. 4, the apparatus being depicted in a sequence of operation subsequent to that of FIG. 5 with the fingers being retracted, the filter paper remaining under the plunger, and the clamp holding the filter paper in place.
Figure 7:
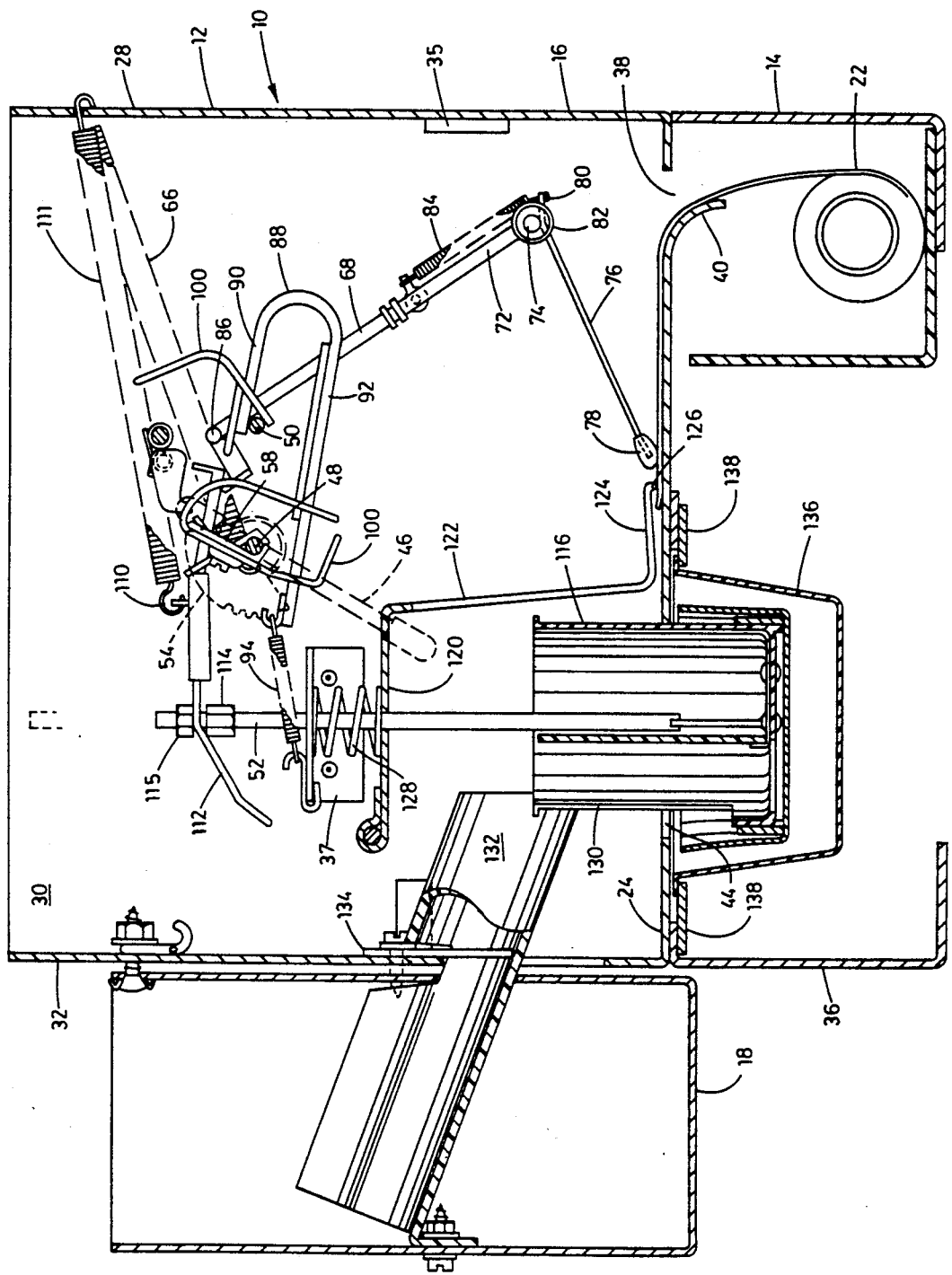
FIG. 7 is a sectional view of the apparatus as shown in FIG. 4, the apparatus being depicted in a sequence of operation subsequent to that of FIG. 6, with the plunger being extended through the aperture, the filter paper being conformably shaped about the outside dimension of the plunger, and the filter paper being sheared in the region of the clamp to form a discrete coffee filter.

Upon counterclockwise rotation of the lever 46, the movement of the combination of elements described above, within the interior of the primary compartment 16, translates to a movement of the finger 76 from right to left in the orientation as depicted, and downwardly against the floor 24. The filter roll 22 which is sandwiched between the floor 24 and the tip 78 is thus advanced forwardly and indexed from right to left such that one of the circular paper portions of the finger roll 22 is positioned or otherwise urged into a location directly above the aperture 44, and beneath the plunger 116 which is oriented in coaxially relationship therewith. The sequence of the operational cycle of the apparatus 10 is best seen in FIG. 5.

Upon further counterclockwise rotation of the lever 46, the piston rod 52 begins to move downwardly, and the fourth segment 126 of the clamp 119 presses into engagement with, or against, the filter roll 22 thereby clamping the filter roll 22 against the floor 24. As should be understood, the fourth segment 126 of the clamp is pressed against the filter roll 22 in the region of the filter roll where two circular paper portions of the filter roll 22 are joined in sequence. This sequence of the operational cycle of the apparatus 10 is best shown by reference to FIG. 6.

Upon further counterclockwise rotation of the lever 46, the plunger 116 extends through its entire stroke, and the circular paper portion of the filter roll 22 which is positioned directly above the aperture 44 and beneath the plunger 116, is conformably shaped about the outside dimension of the plunger 116 to form a discrete coffee filter. Upon pushing the discrete coffee filter downwardly by the stroke of the plunger 116, the discrete coffee filter is separated from the remainder of the filter roll 22 at the location where the fourth course 126 of the clamp 119 is pressed against the filter roll 22. Upon separation of the discrete coffee filter from the remainder of the filter roll 22, the coffee filter is ejected or urged into the basket 136. Coffee grounds may then, if desired, be conveyed down the chute 132 into the hollow interior chamber of the plunger 116, and then into the newly formed coffee filter. The basket 136 may then be removed from the apparatus 10 and then be taken to a coffee brewer.

It is to be understood that there may be other mechanical components which may be constructed and are equivalent to the functions of those described. Though the filter paper roll 22 is shown as a series of circular paper portions, it is to be understood that the paper roll may be made without making such circular paper portions stamped or cut thereon. Additionally, the gate 134, though shown as a manual gate, may be integrated into the elements of the apparatus to be activated upon the same lever movement of the lever 46. It is to be further understood that the apparatus 10 may also be a part of a larger apparatus which integrates brewing functions. As will be appreciated, the invention is not confined to the particular construction and arrangement of parts which are illustrated and described herein, but embraces such modified forms thereof as come within the scope of the following claims.

What is claimed is:

1. An apparatus for forming a discrete coffee filter from a roll of filter paper, the apparatus comprising:
   (a) a suspended floor defining an aperture;
   (b) means for indexing the roll of filter paper across the aperture, and wherein the indexing means includes at least one finger which urges the filter paper against, and advances the filter paper across, the suspended floor; and
   (c) a plunger having an outside dimension which is matingly received in the aperture which is defined by the floor, the plunger being movable to extend through the aperture in the floor, and wherein the filter paper is comformably sized about the outside dimension of the plunger when the filter paper is indexed to a position across the aperture and the plunger is moved through the aperture in the floor.

2. The apparatus of claim 1 and further including a clamp associated with the plunger and which is operable for holding the filter paper in place as the plunger moves through the aperture in the floor.

3. The apparatus of claim 1 and wherein the plunger has a hollow interior chamber and the apparatus further includes a chute which extends into the hollow interior chamber such that a source of coffee grounds may be conveyed down the chute, through the hollow interior chamber of the plunger, and into the coffee filter which is conformably shaped about the outside dimension of the plunger.

4. The apparatus of claim 3 and wherein the chute includes a gate which may be closed to prevent conveyance of the coffee grounds and opened to permit conveyance of the coffee grounds.

5. An apparatus for forming a discrete coffee filter from a roll of filter paper, the apparatus comprising:
   a housing having a suspended floor which defines an aperture;
   means for indexing the roll of filter paper across the aperture, the indexing means including at least one finger which is operable to urge the filter paper against, and advance the filter paper across, the suspended floor; and
   a drive shaft attached to the housing and disposed in force transmitting relation relative to the indexing means;
   a plunger borne by the housing and having an outside dimension which is matingly received by the aperture in the floor, the plunger disposed in force receiving relation relative to the drive shaft and movable through the aperture in the floor, and wherein the filter paper is comformably sized about the outside dimension of the plunger when the filter paper is indexed to a position across the aperture and the plunger is moved through the aperture in the floor; and
   a clamp associated with the plunger and operable to hold the filter paper in place as the plunger is moved through the aperture in the floor.

6. The apparatus of claim 5 and wherein the clamp holds the filter paper in place thereby facilitating the tearing of the filter paper as the plunger is moved to form the discrete coffee filter.

7. The apparatus of claim 5 and wherein the plunger has a hollow interior chamber and the apparatus further includes a chute which extends into the hollow interior chamber such that a source of coffee grounds may be conveyed down the chute, through the hollow interior chamber of the plunger, and into the coffee filter which is conformably shaped about the outside dimension of the plunger.

8. The apparatus of claim 7 and wherein the chute includes a gate which may be closed to prevent conveyance of the coffee grounds and opened to permit conveyance of the coffee grounds.

9. An apparatus for forming a discrete coffee filter from a roll of filter paper, the apparatus comprising:
   a housing having a suspended floor which defines an aperture;
   means for indexing the roll of filter paper across the aperture, the indexing means including at least one finger which urges the filter paper against and advances the filter paper across, the suspended floor;
   a drive shaft attached to the housing and disposed in force transmitting relation relative to the indexing means;
   an idler shaft attached to the housing and disposed in force receiving relation relative to the drive shaft;
   a plunger attached to the housing and disposed in force receiving relation relative to the drive shaft, the plunger having an outside dimension which is matingly received in the aperture defined by the floor and further having a hollow interior chamber, the plunger being movable through the aperture in the floor, and wherein the filter paper is comformably sized about the outside dimension of the plunger when the filter paper is indexed to a position across the aperture and the plunger is moved through the aperture in the floor; and
   a chute attached to the housing and which extends into the hollow interior chamber such that a source of coffee grounds may be conveyed down the chute through the hollow interior chamber of the plunger, and into the coffee filter which is conformably shaped about the outside dimension of the plunger.

10. The apparatus of claim 9 and further including means for holding the filter paper in place as the plunger is moved to extend through the aperture in the floor.

11. The apparatus of claim 9 further including a means for shearing the roll of filter paper to separate the portion which is conformably shaped about the outside dimension of the plunger from the remainder of the roll of filter paper to form a discrete coffee filter.

12. The apparatus of claims, 10 and wherein the means for holding the roll of filter paper is a clamp which associated with the plunger and which holds the filter paper in place as the plunger tears the filter paper.

* * * * *